United States Patent
Kim et al.

(10) Patent No.: US 11,881,599 B2
(45) Date of Patent: Jan. 23, 2024

(54) CURRENT INTERRUPT DEVICE HAVING CONNECTION PARTS WITH CONTACTING INCLINED SURFACES AND BATTERY MODULE INCLUDING THE SAME

(71) Applicant: LG Chem, Ltd., Seoul (KR)

(72) Inventors: Kyoung Ho Kim, Daejeon (KR); Song Taek Oh, Daejeon (KR); Jung Seok Choi, Daejeon (KR); Jong Pil Park, Daejeon (KR)

(73) Assignee: LG Energy Solution, Ltd.

( * ) Notice: Subject to any disclaimer, the term of this patent is extended or adjusted under 35 U.S.C. 154(b) by 48 days.

(21) Appl. No.: 17/513,387

(22) Filed: Oct. 28, 2021

(65) Prior Publication Data
US 2022/0052428 A1 Feb. 17, 2022

Related U.S. Application Data

(63) Continuation of application No. 16/626,418, filed as application No. PCT/KR2018/015200 on Dec. 3, 2018, now Pat. No. 11,189,892.

(30) Foreign Application Priority Data

Feb. 12, 2018 (KR) .......................... 10-2018-0017174

(51) Int. Cl.
*H01M 50/578* (2021.01)
*H01M 50/557* (2021.01)
(Continued)

(52) U.S. Cl.
CPC .......... *H01M 50/578* (2021.01); *H01M 50/51* (2021.01); *H01M 50/553* (2021.01); *H01M 50/557* (2021.01)

(58) Field of Classification Search
CPC .......................... H01M 50/578; H01M 50/502
(Continued)

(56) References Cited

U.S. PATENT DOCUMENTS

| 1,438,609 A | 12/1922 | Perkins |
| 2009/0098445 A1 | 4/2009 | Kim |

(Continued)

FOREIGN PATENT DOCUMENTS

| CN | 101752601 A | 6/2010 |
| CN | 102035186 A | 4/2011 |

(Continued)

OTHER PUBLICATIONS

Chinese Search Report for Application No. 201910111399.3 dated Mar. 16, 2020, 2 pages.

(Continued)

*Primary Examiner* — Sean P Cullen
(74) *Attorney, Agent, or Firm* — Lerner David LLP

(57) ABSTRACT

A current interrupt device, which may be included in a battery module, includes first and second connection parts each having one surface on which an inclined surface is formed; wherein the inclined surface of the first connection part and the inclined surface of the second connection part contact each other to form a contact interface, the first connection part and the second connection part are electrically connected to each other, and when an external force equal to or greater than a predetermined force is applied to the inclined surface of the first connection part or the inclined surface of the second connection part, the inclined surface of the first connection part and the inclined surface of the second connection part are dislocated with respect to each other on the contact interface to interrupt electrical connection between the first connection part and the second connection part.

9 Claims, 6 Drawing Sheets

(51) Int. Cl.
  *H01M 50/553* (2021.01)
  *H01M 50/51* (2021.01)

(58) Field of Classification Search
  USPC .................................. 429/61, 156, 158, 160
  See application file for complete search history.

(56) References Cited

U.S. PATENT DOCUMENTS

| | | |
|---|---|---|
| 2011/0081560 A1 | 4/2011 | Kim et al. |
| 2014/0038471 A1 | 2/2014 | Yang et al. |
| 2014/0065467 A1 | 3/2014 | Choi et al. |
| 2014/0205889 A1* | 7/2014 | Kim ................ H01M 50/55 |
| | | 429/158 |
| 2015/0072179 A1 | 3/2015 | Itabashi |
| 2015/0171480 A1 | 6/2015 | Seo et al. |
| 2016/0072119 A1 | 3/2016 | Umeyama et al. |
| 2016/0211503 A1 | 7/2016 | Schemberg et al. |
| 2016/0268584 A1 | 9/2016 | Tsutsui et al. |
| 2018/0183035 A1 | 6/2018 | Hirose et al. |
| 2020/0144587 A1 | 5/2020 | Kim et al. |

FOREIGN PATENT DOCUMENTS

| | | | |
|---|---|---|---|
| CN | 105474433 A | 4/2016 | |
| CN | 107123756 A | 9/2017 | |
| CN | 107123779 A | 9/2017 | |
| CN | 209461565 U | 10/2019 | |
| JP | 2014519153 A | 8/2014 | |
| JP | 2015056380 A | 3/2015 | |
| JP | 2015519715 A | 7/2015 | |
| KR | 19990034987 A | 5/1999 | |
| KR | 20030044512 A | 6/2003 | |
| KR | 20130014250 A | 2/2013 | |
| KR | 101252869 B1 | 4/2013 | |
| KR | 20130080023 A | 7/2013 | |
| KR | 20160068722 A | 6/2016 | |
| KR | 20170004191 A | 1/2017 | |
| WO | 2013111318 A1 | 8/2013 | |
| WO | 2014033806 A1 | 3/2014 | |
| WO | 2014119095 A1 | 8/2014 | |
| WO | WO-2014119095 A1 * | 8/2014 | ............ H01M 2/348 |
| WO | 2016194571 A1 | 12/2016 | |

OTHER PUBLICATIONS

Chinese Search Report for Application No. CN201910111399.3 dated Jul. 24, 2020.
Extended European Search Report including Written Opinion for Application No. EP18904864.8, dated Oct. 7, 2020, pp. 1-8.
International Search Report from PCT/KR2018/015200, dated Mar. 8, 2019, pp. 1-2.

* cited by examiner

CURRENT INTERRUPT DEVICE HAVING CONNECTION PARTS WITH CONTACTING INCLINED SURFACES AND BATTERY MODULE INCLUDING THE SAME

CROSS-REFERENCE TO RELATED APPLICATION

The present application is a continuation of U.S. patent application Ser. No. 16/626,418, filed on Dec. 24, 2019, which is a national phase entry under 35 U.S.C. § 371 of International Application No. PCT/KR2018/015200, filed Dec. 3, 2018, which claims the benefit of the priority of Korean Patent Application No. 10-2018-0017174, filed on Feb. 12, 2018, both of which are hereby incorporated by reference in their entirety.

TECHNICAL FIELD

The present invention relates to a current interrupt device and a battery module including the same, and more particularly, to a current interrupt device that is capable of improving safety of a battery module and a battery module including the same.

BACKGROUND ART

As demands of secondary batteries, which are repeatedly chargeable and dischargeable, increase, the importance of safety of secondary batteries is also increasing. For example, an increase of a capacity per unit volume of a secondary battery is required. As the capacity per unit volume of the secondary battery increases, safety of the secondary battery tends to be more vulnerable. Thus, the safety of the secondary battery needs to be improved as well as the capacity of the secondary battery. Particularly, when a lithium secondary battery is overcharged, a risk of ignition of the lithium secondary battery increases. Thus, it is essential to secure the safety in the lithium secondary battery.

According to the related art, in order to solve the problem of the ignition within the secondary battery, a technique of adding an anti-ignition material or the like to an electrolyte that is charged in the secondary battery is being used, or a technique of mounting a device such as a current interrupt device (CID) within the secondary battery is being used.

However, the safety devices of the secondary battery according to the related art are constituents for securing the safety of one secondary battery. Thus, in the case of a battery module in which a plurality of secondary batteries is assembled, there is a problem that the safety of the battery module is limited by only the safety device according to the related art.

For example, in the case of the battery module, since the secondary batteries are electrically connected to each other, a temperature of the entire battery module rapidly increases due to electrical interaction between the secondary batteries. Thus, it is necessary to secure safety in an aspect of the battery module separately from the individual safety of the secondary battery.

DISCLOSURE OF THE INVENTION

Technical Problem

To solve the above problem, an object of the present invention is to improve safety of a battery module by preventing ignition that may occur due to electrical interaction between secondary batteries in the battery module from occurring.

Technical Solution

According to one aspect of the present invention, a current interrupt device includes: a first connection part having one surface on which an inclined surface is formed; and a second connection part having one surface on which an inclined surface having a shape corresponding to the inclined surface of the first connection part is formed, wherein the inclined surface of the first connection part and the inclined surface of the second connection part contact each other to form a contact interface, the first connection part and the second connection part are electrically connected to each other, and when an external force equal to or greater than a predetermined force is applied to the inclined surface of the first connection part or the inclined surface of the second connection part, the inclined surface of the first connection part and the inclined surface of the second connection part are dislocated with respect to each other on the contact interface to interrupt electrical connection between the first connection part and the second connection part.

The current interrupt device may further include an adhesion part disposed on the contact interface so that the inclined surface of the first connection part and the inclined surface of the second connection part adhere to each other.

The current interrupt device may further include a pressing part disposed above or below the first connection part and the second connection part to press the first connection part and the second connection part downward or upward, respectively.

The current interrupt device may further include a support part supporting the pressing part so that the pressing part presses the first connection part and the second connection part.

The current interrupt device may further include an upper pressing part may be disposed above the first connection part and the second connection part that presses the first connection part and the second connection part downward, and a lower pressing part may be disposed below the first connection part and the second connection part that presses the first connection part and the second connection part upward.

The current interrupt device may further include a first fixing part disposed on an outer portion of the first connection part so that the first connection part is configured to be coupled to a portion of a circumferential portion of a first secondary battery, and a second fixing part disposed on an outer portion of the second connection part so that the second connection part is configured to be coupled to a portion of a circumferential portion of a second secondary battery.

The current interrupt device may further include a pressing part disposed above or below the first connection part and the second connection part to press the first connection part and the second connection part downward or upward, respectively, wherein the sum of adhesion strength of the adhesion part and an elastic modulus of the pressing part may be 2 kgf/cm to 5 kgf/cm.

According to another aspect of the present invention, a battery module includes: a first battery; a second battery spaced apart from the first battery; and a current interrupt device disposed between the first battery and the second battery, wherein the current interrupt device includes: a first connection part having one surface on which an inclined surface is formed; and a second connection part having one surface on which an inclined surface having a shape corresponding to the inclined surface of the first connection part is formed, wherein the inclined surface of the first connection part and the inclined surface of the second connection part contact each other to form a contact interface, the first connection part and the second connection part are electrically connected to each other, and when an external force equal to or greater than a predetermined force is applied to the inclined surface of the first connection part or the inclined surface of the second connection part, the inclined surface of the first connection part and the inclined surface of the second connection part are dislocated with respect to each other on the contact interface to interrupt electrical connection between the first connection part and the second connection part.

Advantageous Effects

According to the present invention, the ignition that may occur due to the electrical interaction between the secondary batteries in the battery module may be prevented to improve the safety of the battery module.

MODE FOR CARRYING OUT THE INVENTION

Hereinafter, a structure of a current interrupt device according to the present invention will be described with reference to the accompanying drawings.

Current Interrupt Device

Figure 1:
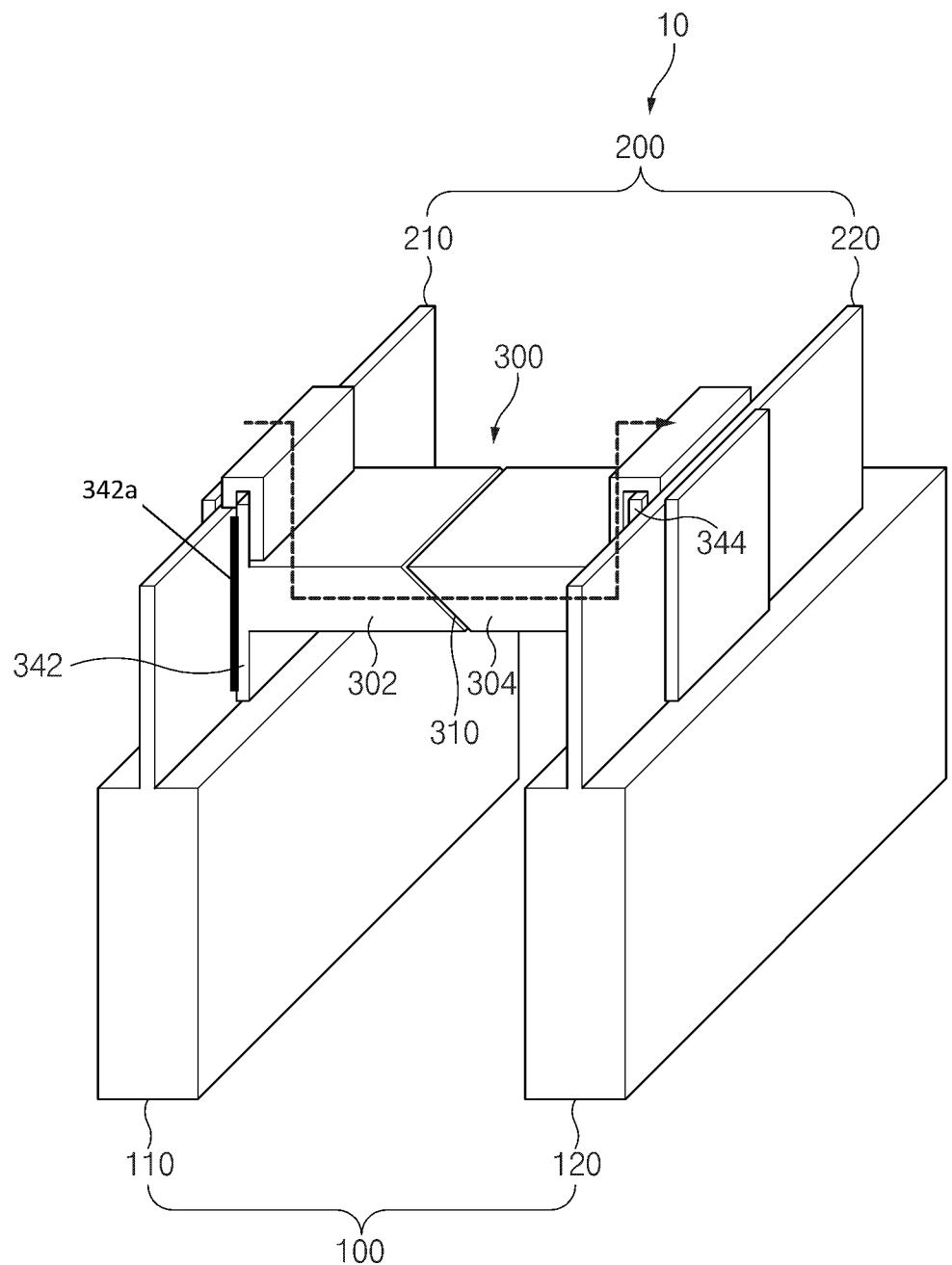
FIG. 1 is a perspective view illustrating a first example of a structure of a current interrupt device in a state in which a battery module normally operates according to the present invention.

FIG. 1 is a perspective view illustrating a first example of a structure of a current interrupt device in a state in which a battery module normally operates according to the present invention.

As illustrated in FIG. 1, a battery module 10 according to the present invention may include a plurality of batteries 100. The plurality of batteries 100 may be secondary batteries, for example, lithium secondary batteries. In FIG. 1, a first battery 110 and a second battery 120 are illustrated as constituents of the plurality of batteries 100. However, the battery module 10 may include three or more batteries. A lead 200 may be provided in each of the plurality of batteries constituting the battery module according to the present invention. FIG. 1 illustrates a case in which a first lead 210 and a second lead 220 are respectively provided in the first battery 110 and a second battery 120.

A current interrupt device 300 may be provided between the first battery 110 and the second battery 120.

As illustrated in FIG. 1, the current interrupt device 300 according to the first example of the present invention may include a plurality of connection parts including an inclined surface. That is, as illustrated in FIG. 1, the current interrupt device 300 according to the first example of the present invention may include a first connection part 302 having one surface on which an inclined surface SL (see FIG. 2) is formed and a second connection part 304 having an inclined surface corresponding to the inclined surface of the first connection part 302. Here, that the inclined surfaces correspond to each other may mean that the inclined surfaces face each other. Also, the inclined surface of the first connection part 302 and the inclined surface of the second connection part 304 may have the same shape and size.

Also, the first connection part 302 may be connected and fixed to the first battery 110, and the second connection part 304 may be connected and fixed to the second battery 120. For this, a first fixing part 342 coupled to a portion of a circumferential portion of the first battery 110 may be provided on an outer portion of the first connection part 302, and a second fixing part 344 coupled to a portion of a circumferential portion of the second battery 120 may be provided on an outer portion of the second connection part 304. As illustrated in FIG. 1, the first fixing part 342 may be provided on one surface, on which the first connection part 302 is provided, of both surfaces of the first battery 110, and the second fixing part 344 may be provided on one surface on which the second connection part 304 is provided. Also, the first fixing part 342 may be coupled to the first lead 210 of the first battery 110, and the second fixing part 344 may be coupled to the second lead 220 of the second battery 120. Also, an adhesion material 342a may be applied to at least a portion of the surface on which the first fixing part 342 and the circumferential portion of the first battery 110 are coupled to each other. Also, the adhesion material may be applied to at least a portion of the surface on which the second fixing part 344 and the circumferential portion of the second battery 120 are coupled to each other.

The first connection part 302 and the second connection part 304 may be respectively connected to the first battery 110 and the second battery 120. The inclined surfaces of the first connection part 302 and the second connection part 304 may contact each other to form a contact interface. Also, an adhesion part 310 having adhesion force so that the inclined surface of the first connection part 302 and the inclined surface of the second connection part 304 adhere to each other may be formed between the first connection part 302 and the second connection part 304. In this specification and attached claims, even when the adhesion part is provided between the first connection part 302 and the second connection part 304, it should be interpreted that the inclined surfaces of the first connection part 302 and the second connection part 304 may contact each other.

The first connection part 302 and the second connection part 304 may be electrically connected to each other. Here, the electrical connection may mean that current flows between the first connection part 302 and the second connection part 304. To electrically connect the first connection part 302 to the second connection part 304, the adhesion part 310 may include a material having electrical conductivity.

As illustrated in FIG. 1, the current interrupt device 300 according to the first example of the present invention may be generally provided between the first battery 110 and the second battery 120 to electrically connect the first battery 110 and the second battery 120 to each other.

When a portion or whole of the plurality of batteries constituting the battery module is overcharged, the overcharged battery is swollen due to vaporization of the electrolyte and an increase in thickness of the electrode assembly.

Figure 2:
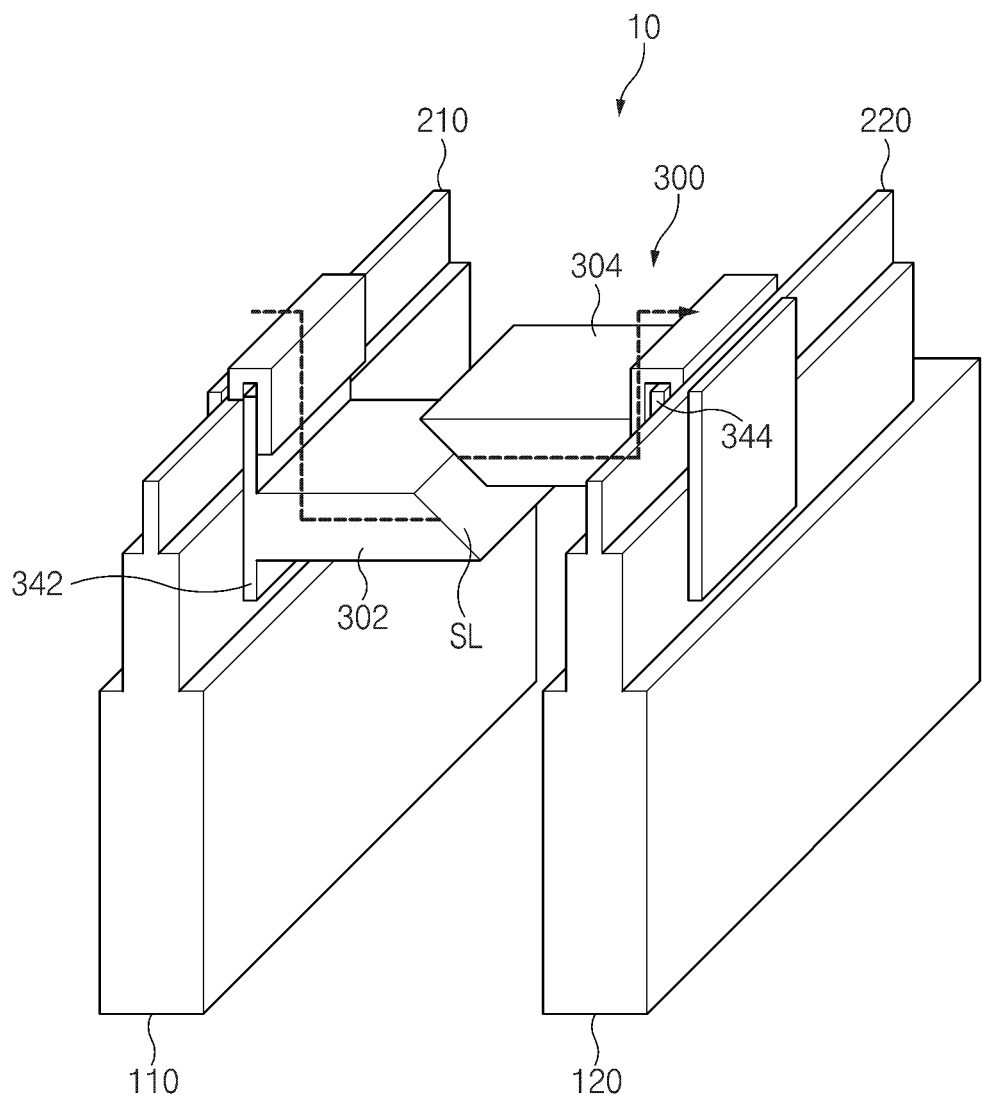
FIG. 2 is a perspective view illustrating a principle of interrupting current by the current interrupt device according to the first example when the battery module is overcharged.

FIG. 2 is a perspective view illustrating a principle of interrupting current by the current interrupt device according to the first example when the battery module is overcharged.

Referring to FIG. 2, when the first battery 110 is swollen, the first battery 110 may apply external force from the first connection part 302 toward the inclined surface of the first connection part 302. When the second battery 120 is swollen, the second battery may apply external force from the second connection part 304 toward the inclined surface of the second connection part 304.

When the external forces are applied toward the inclined surface of the first connection part 302 or the second connection part 304 by the first connection part 302 or the second connection part 304, if the applied external force is less than predetermined force, the current interrupt device 300 in addition to the first connection part 302 and the second connection part 304 may not be deformed. This is done because the adhesion force due to the adhesion part 310 exists between the inclined surface of the first connection part 302 and the inclined surface of the second connection part 304.

However, if the external force acting on the first connection 302 or the second connection part 304 is equal to or greater than predetermined force, it may be difficult to maintain the adhesion between the first connection part 302 and the second connection part 304 through only the adhesion force between the inclined surface of the first connection part 302 and the inclined surface of the second connection part 304. Thus, as illustrated in FIG. 2, the inclined surface of the first connection part 302 and the inclined surface of the second connection part 304 are dislocated with respect to each other, and thus, the first connection part 302 and the second connection part 304 are electrically interrupted with respect to each other. Thus, the first battery 110 and the second battery 120 may be electrically interrupted with respect to each other to stop an operation of the battery module 10.

Figure 3:
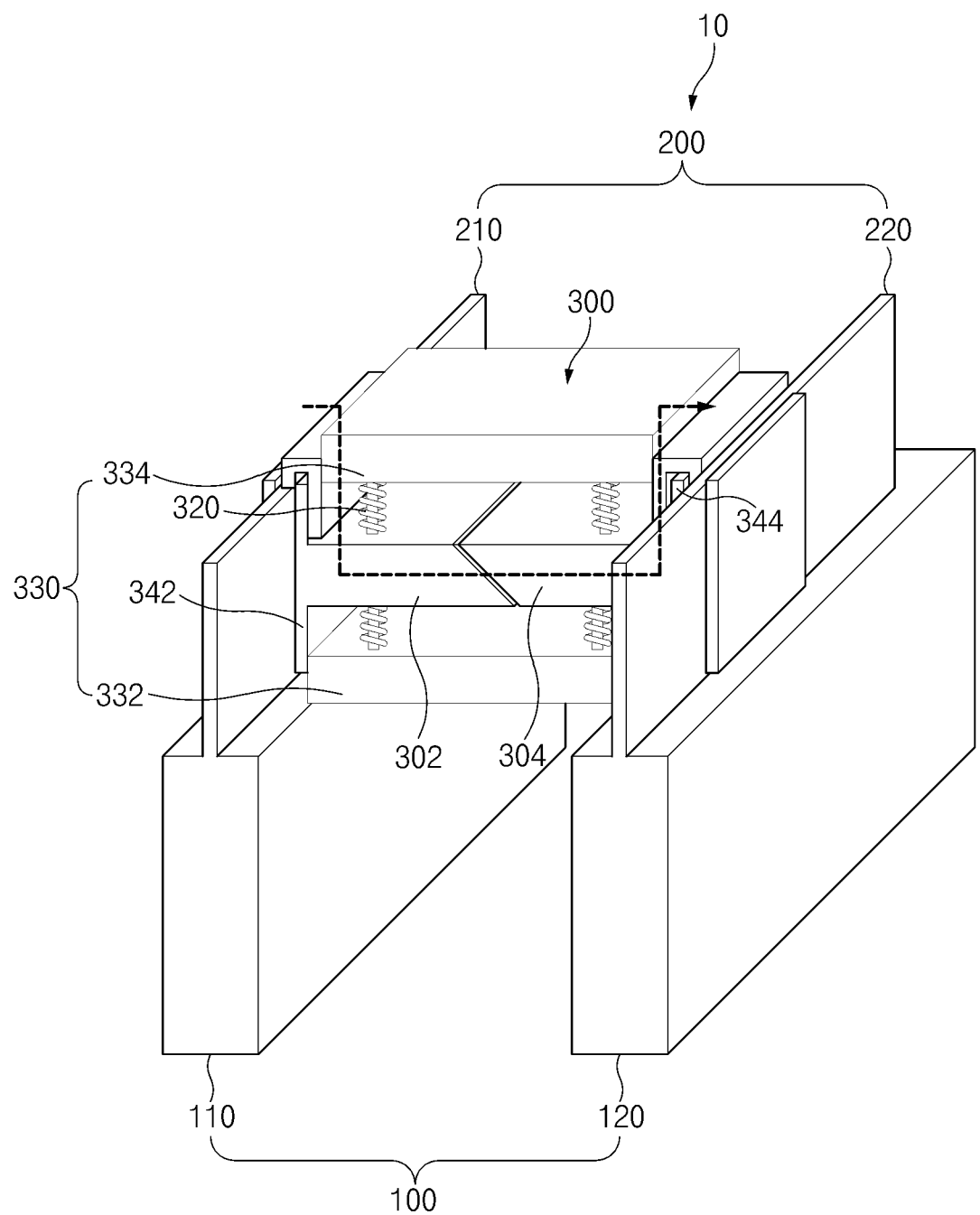
FIG. 3 is a perspective view illustrating a second example of a structure of a current interrupt device in a state in which a battery module normally operates according to the present invention.

FIG. 3 is a perspective view illustrating a second example of a structure of the current interrupt device in a state in which the battery module normally operates according to the present invention.

According to a current interrupt device according to a second example of the present invention, if external force equal to or greater than predetermined force is applied to a first connection part 302 and a second connection part 304, the inclined surface SL (see FIG. 4) of the first connection part 302 and the inclined surface of the second connection part 304 may be dislocated with respect to each other, and thus, the first connection part 302 and the second connection part 304 may be electrically interrupted. In this point, the current interrupt devices according to the first and second examples of the present invention may be similar to each other. However, the current interrupt device according to the second example of the present invention is different from the current interrupt device according to the first example of the present invention in terms of a detailed configuration for realizing the above principle. Hereinafter, the current interrupt device according to the second example of the present invention will be described with a focus on differences from the current interrupt device according to the first example of the present invention.

As illustrated in FIG. 3, the current interrupt device 300 according to the second example of the present invention may include a pressing part 320 disposed above or below the first connection part 302 and the second connection part 304 to press the first connection part 302 and the second connection part 304 downward or upward, respectively. For example, as illustrated in FIG. 3, the pressing part may be provided above and below the first connection part 302 and the second connection part 304. The pressing part 320 disposed above the first connection part 302 and the second connection part 304 may press the first connection part 302 and the second connection part 304 downward, and the pressing part 320 disposed below the first connection part 302 and the second connection part 304 may press the first connection part 302 and the second connection part 304 upward. Here, the pressing part 320 may be a constituent having elasticity. For example, the pressing part 320 may have a spring structure.

To press the first connection part 302 or the second connection part 304, the pressing part may be supported by a different constituent. For this, the current interrupt device 300 according to the second example of the present invention may include a support part 330 supporting the pressing part 320 so that the pressing part 320 presses the first connection part 302 and the second connection part 304.

Here, as illustrated n FIG. 3, when the pressing part 320 is provided above and below the first connection part 302 and the second connection part 304, the support part 330 may include a first support part 332 provided below the pressing part 320 to support the pressing part 320 provided below the first connection part 302 and the second connection part 304 and a second support part 334 provided above the pressing part 320 to support the pressing part 320 disposed above the first connection part 302 and the second connection part 304.

Figure 4:
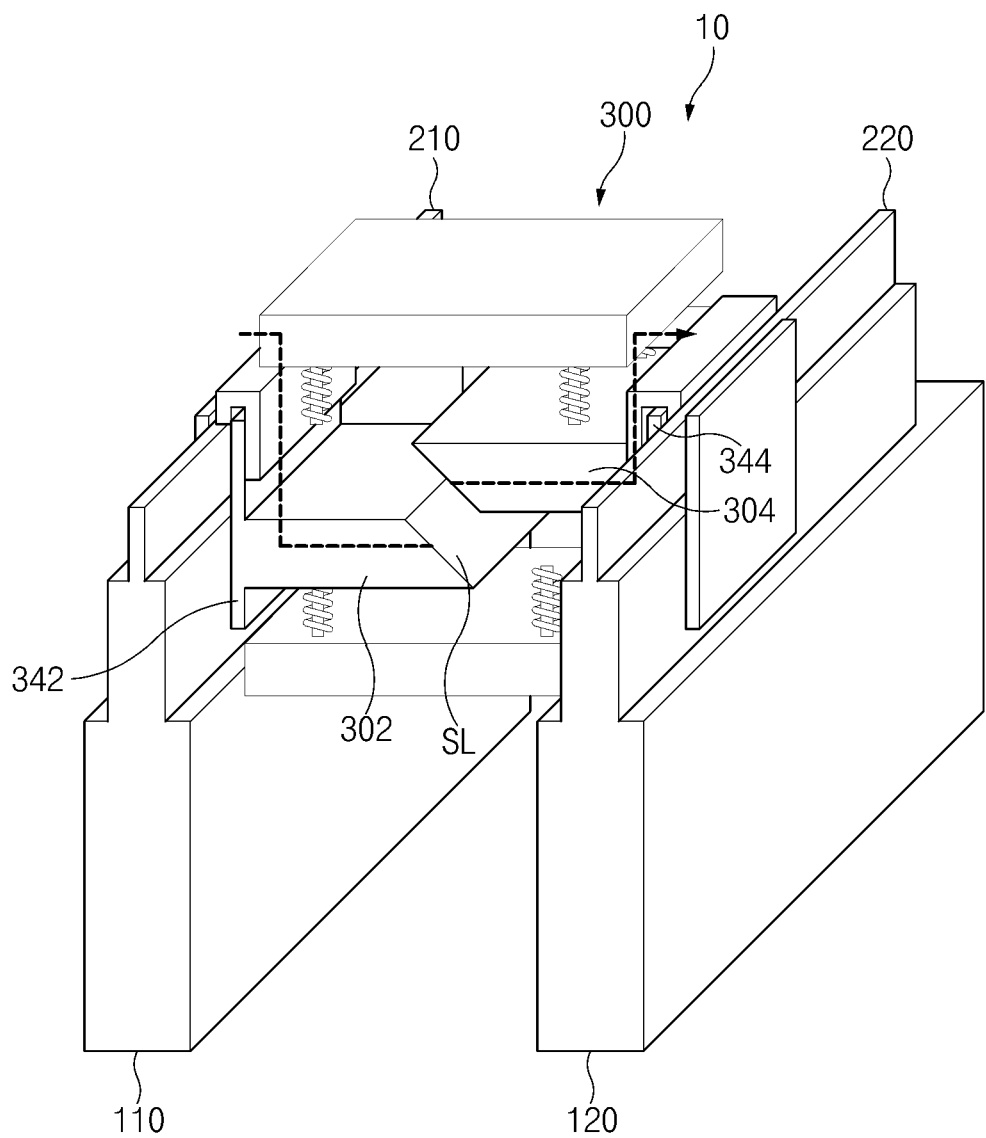
FIG. 4 is a perspective view illustrating a principle of interrupting current by the current interrupt device according to the second example when the battery module is overcharged.

FIG. 4 is a perspective view illustrating a principle of interrupting current by the current interrupt device according to the second example when the battery module is overcharged.

Referring to FIG. 4, when the first battery 110 is swollen, the first battery 110 may apply external force from the first connection part 302 toward the inclined surface of the first connection part 302. When the second battery 120 is swollen, the second battery may apply external force from the second connection part 304 toward the inclined surface of the second connection part 304.

When the external forces are applied toward the inclined surface of the first connection part 302 or the second connection part 304 by the first connection part 302 or the second connection part 304, if the applied external force is less than predetermined force, the current interrupt device 300 in addition to the first connection part 302 and the second connection part 304 may not be deformed. This is done because the pressing part 320 presses the first connection part 302 and the second connection part 304 upward or downward so that static frictional force acts between the inclined surface of the first connection part 302 and the inclined surface of the second connection part 304.

However, if the external force acting on the first connection 302 or the second connection part 304 is equal to or greater than predetermined force, it may be difficult to maintain the contact between the first connection part 302 and the second connection part 304 through only the static frictional force between the inclined surface of the first connection part 302 and the inclined surface of the second connection part 304. Thus, as illustrated in FIG. 4, the inclined surface of the first connection part 302 and the inclined surface of the second connection part 304 are dislocated with respect to each other, and thus, the first connection part 302 and the second connection part 304 are electrically interrupted. Thus, the first battery 110 and the second battery 120 may be electrically cut off to stop an operation of the battery module 10.

Figure 5:
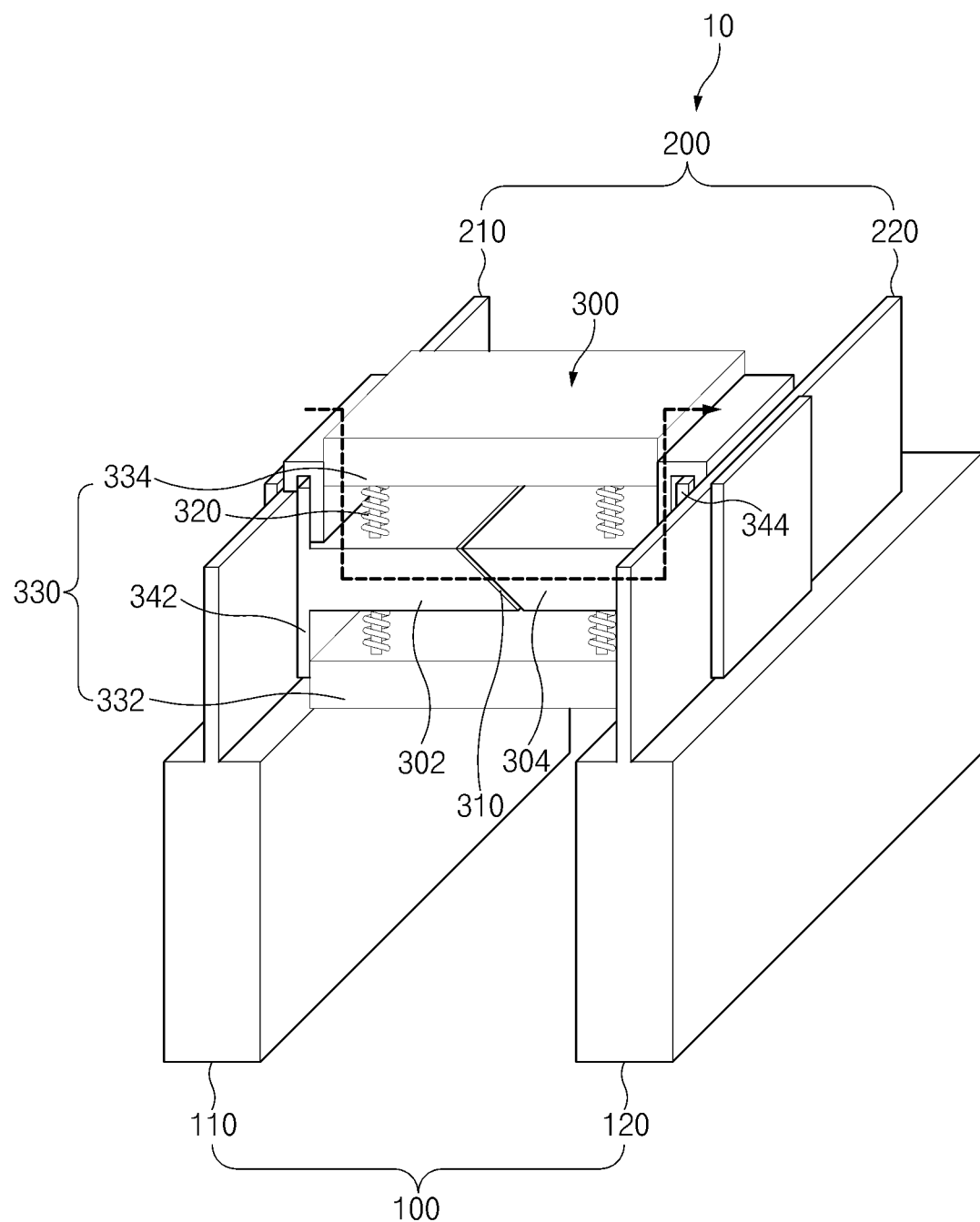
FIG. 5 is a perspective view illustrating a third example of a structure of a current interrupt device in a state in which a battery module normally operates according to the present invention.
Figure 6:
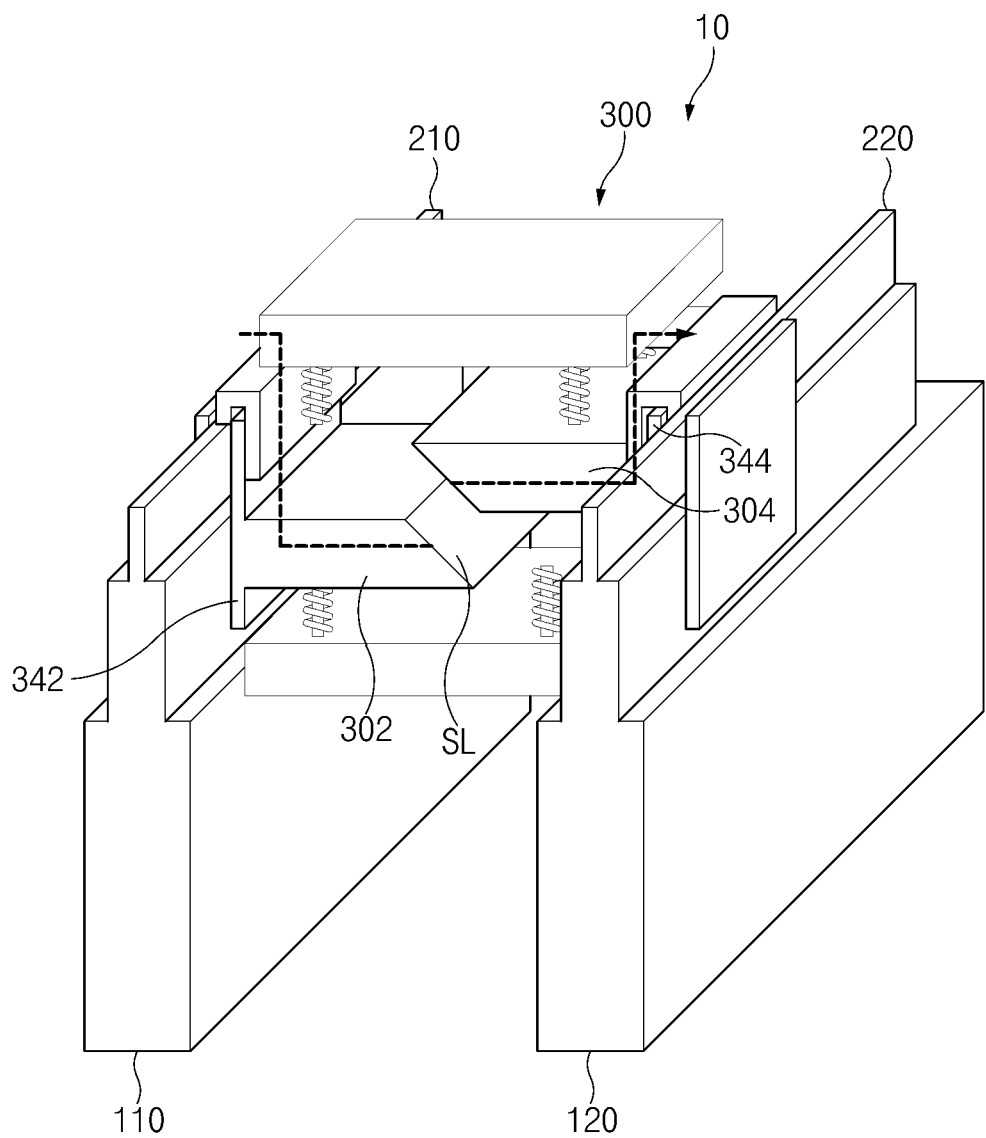
FIG. 6 is a perspective view illustrating a principle of interrupting current by the current interrupt device according to the third example when the battery module is overcharged.

FIG. 5 is a perspective view illustrating a third example of a structure of a current interrupt device in a state in which a battery module normally operates according to the present invention, and FIG. 6 is a perspective view illustrating a principle of interrupting current by the current interrupt device according to the third example when the battery module is overcharged.

A current interrupt device 300 according to a third example of the present invention may have a structure in which the adhesion part 310 of the current interrupt device according to the first example of the present invention and the pressing parts 320 and the support part 330 of the current interrupt device according to the second example of the present invention are coupled to each other. In the current interrupt device 300 according to the third example of the present invention, descriptions of an adhesion part 310, a pressing part 320, and a support part 330 are substituted for those of the current interrupt devices according to the first and second examples of the present invention.

In the current interrupt devices according to the first to third examples of the present invention, when the external force equal to or greater than the predetermined force is applied, the inclined surface of the first connection part and the inclined surface of the second connection part may be dislocated with respect to each other to interrupt the electrical connection between the first connection part and the second connection part. Thus, the magnitude of the external force when the electrical connection between the first connection part and the second connection part is interrupted may depend on the adhesion strength of the adhesion part or the strength at which the pressing part presses the first connection part and the second connection part. Particularly, when the pressing part has elasticity, the strength at which the pressing part presses the first connection part and the second connection part may depend on an elastic modulus of the entire pressing part. Here, when the pressing part is provided in plurality, the elastic modulus of the entire pressing part may be defined as magnitude of force required to deform the entire pressing part provided in the current interrupt device by a unit length.

However, when the adhesion strength of the adhesion part or the elastic modulus of the entire pressing part is too large in the current interrupt device according to the present invention, the external force at which the electrical interruption occurs may be too large. As a result, there is a problem in that safety of the battery module is not ensured due to the fact that the electrical interruption does not occur even though the electrical interruption has to occur.

The swelling of the battery may occur not only in an overcharged state but also a state in which the battery is stored at a high temperature. However, the battery is simply stored at the high temperature, possibility of ignition of the battery is low, and thus, the interruption of the current may be unnecessary. However, if the adhesion strength of the adhesion part or the elastic modulus of the entire pressing part is too small in the current interrupt device according to the present invention, even when the battery or the battery module is merely stored at the high temperature, the current interruption may occur, and a defective rate of the battery module may increase. Thus, to secure the safety of the battery module and simultaneously minimize the defective rate of the battery module, it is necessary that the adhesion strength of the adhesion part or the elastic modulus with respect to the entire pressing part is properly set within a predetermined range when manufacturing the current interrupt device and manufacturing the battery module.

EMBODIMENTS

Hereinafter, the contents of the present invention will be described in more detail through Embodiments and Experimental Examples. However, Embodiments and Experimental Examples are merely examples as illustrative purpose, and thus, the technical scope of the present invention is not limited thereto.

Embodiment 1

In Embodiment 1 of the present invention, a pressing part was used in a current interrupt device. An elastic modulus with respect to the entire pressing part was 3 kgf/cm.

The current interrupt device according to Embodiment 1 was mounted in a battery module to manufacture the battery module. Then, the battery module was overcharged or stored at a high temperature to measure whether the current interrupt device operates.

Embodiment 2

In Embodiment 2 of the present invention, a pressing part was used in a current interrupt device. An elastic modulus with respect to the entire pressing part was 5 kgf/cm.

The current interrupt device according to Embodiment 2 was mounted in a battery module to manufacture the battery module. Then, the battery module was overcharged or stored at a high temperature to measure whether the current interrupt device operates. The overcharging condition of the battery module and the high-temperature storage condition of the battery module in Embodiment 2 are the same as those in Embodiment 1.

Embodiment 3

In Embodiment 3 of the present invention, an adhesion part and a pressing part were used together in a current interrupt device. Adhesion strength of the adhesion part was 1 kgf/cm, and an elastic modulus with respect to the entire pressing part was 1 kgf/cm. The adhesion strength of the adhesion part is defined as force required when each of both constituents are stretched by a unit length on an adhesion surface when both the constituents are stretched after both the constituents adhere to each other.

The current interrupt device according to Embodiment 3 was mounted in a battery module to manufacture the battery module. Then, the battery module was overcharged or stored at a high temperature to measure whether the current interrupt device operates. The overcharging condition of the battery module and the high-temperature storage condition of the battery module in Embodiment 3 are the same as those in Embodiment 1.

Embodiment 4

In Embodiment 4 of the present invention, an adhesion part and a pressing part were used together in a current interrupt device. Adhesion strength of the adhesion part was 1 kgf/cm, and an elastic modulus with respect to the entire pressing part was 3 kgf/cm.

The current interrupt device according to Embodiment 4 was mounted in a battery module to manufacture the battery module. Then, the battery module was overcharged or stored at a high temperature to measure whether the current interrupt device operates. The overcharging condition of the battery module and the high-temperature storage condition of the battery module in Embodiment 4 are the same as those in Embodiment 1.

Embodiment 5

In Embodiment 5 of the present invention, an adhesion part was used in a current interrupt device. Adhesion strength of the adhesion part was 2 kgf/cm.

The current interrupt device according to Embodiment 5 was mounted in a battery module to manufacture the battery module. Then, the battery module was overcharged or stored at a high temperature to measure whether the current interrupt device operates. The overcharging condition of the battery module and the high-temperature storage condition of the battery module in Embodiment 5 are the same as those in Embodiment 1.

Embodiment 6

In Embodiment 6 of the present invention, an adhesion part and a pressing part were used together in a current interrupt device. Adhesion strength of the adhesion part was 2 kgf/cm, and an elastic modulus with respect to the entire pressing part was 2 kgf/cm.

The current interrupt device according to Embodiment 6 was mounted in a battery module to manufacture the battery module. Then, the battery module was overcharged or stored at a high temperature to measure whether the current interrupt device operates. The overcharging condition of the battery module and the high-temperature storage condition of the battery module in Embodiment 6 are the same as those in Embodiment 1.

Comparative Example 1

In Comparative Example 1 of the present invention, a pressing part was used in a current interrupt device. An elastic modulus with respect to the entire pressing part was 1 kgf/cm.

The current interrupt device according to Comparative Example 1 was mounted in a battery module to manufacture the battery module. Then, the battery module was overcharged or stored at a high temperature to measure whether the current interrupt device operates. The overcharging condition of the battery module and the high-temperature storage condition of the battery module in Comparative Example 1 are the same as those in Embodiment 1.

Comparative Example 2

In Comparative Example 2 of the present invention, a pressing part was used in a current interrupt device. An elastic modulus with respect to the entire pressing part was 7 kgf/cm.

The current interrupt device according to Comparative Example 2 was mounted in a battery module to manufacture the battery module. Then, the battery module was overcharged or stored at a high temperature to measure whether the current interrupt device operates. The overcharging condition of the battery module and the high-temperature storage condition of the battery module in Comparative Example 2 are the same as those in Embodiment 1.

Comparative Example 3

In Comparative Example 3 of the present invention, an adhesion part was used in a current interrupt device. Adhesion strength of the adhesion part was 1 kgf/cm.

The current interrupt device according to Comparative Example 3 was mounted in a battery module to manufacture the battery module. Then, the battery module was overcharged or stored at a high temperature to measure whether the current interrupt device operates. The overcharging condition of the battery module and the high-temperature storage condition of the battery module in Comparative Example 3 are the same as those in Embodiment 1.

Comparative Example 4

In Comparative Example 4 of the present invention, an adhesion part and a pressing part were used together in a current interrupt device. Adhesion strength of the adhesion part was 1 kgf/cm, and an elastic modulus with respect to the entire pressing part was 5 kgf/cm.

The current interrupt device according to Comparative Example 4 was mounted in a battery module to manufacture the battery module. Then, the battery module was overcharged or stored at a high temperature to measure whether the current interrupt device operates. The overcharging condition of the battery module and the high-temperature storage condition of the battery module in Comparative Example 4 are the same as those in Embodiment 1.

Comparative Example 5

In Comparative Example 5 of the present invention, an adhesion part and a pressing part were used together in a current interrupt device. Adhesion strength of the adhesion part was 2 kgf/cm, and an elastic modulus with respect to the entire pressing part was 5 kgf/cm.

The current interrupt device according to Comparative Example 5 was mounted in a battery module to manufacture the battery module. Then, the battery module was overcharged or stored at a high temperature to measure whether the current interrupt device operates. The overcharging condition of the battery module and the high-temperature storage condition of the battery module in Comparative Example 5 are the same as those in Embodiment 1.

Experimental Example 1

In Experimental Example 1, the battery modules manufactured according to Embodiments 1 to 6 and Comparative Examples 1 to 5 were overcharged to measure whether the current interrupt devices interrupt current.

The overcharging conditions of the battery module are as follows. The battery module in which five batteries, each of which has a voltage of 4.2 V when a state of charge (SOC) is 100%, are connected in series to each other were overcharged by 50% so that the entire battery module has a voltage of 31.5 V (4.2V*5*1.5). In a state in which constant current flows when the battery module is overcharged, charging was performed for one hour.

Experimental Example 2

In Experimental Example 2, the battery modules manufactured according to Embodiments 1 to 6 and Comparative Examples 1 to 5 were stored at a high temperature to measure whether the current interrupt devices interrupt current.

The high-temperature storage conditions of the battery module are as follows. In Embodiment 2, the battery module was charged so that the state of charge (SOC) of the battery module is 100% and then was stored for 8 weeks in a chamber at 60 degrees Celsius.

Experimental Example 1 and Experimental Example 2 were conducted on the battery modules according to Examples and Comparative Examples, and the results are shown in Table 1 below.

TABLE 1

| Classification | Embodiment | | | | | | Comparative Example | | | | |
|---|---|---|---|---|---|---|---|---|---|---|---|
| | 1 | 2 | 3 | 4 | 5 | 6 | 1 | 2 | 3 | 4 | 5 |
| Experimental Example 1 | Interrupt | Interrupt | Interrupt | Interrupt | Interrupt | Interrupt | Interrupt | Not interrupt | Interrupt | Not interrupt | Not interrupt |
| Experimental Example 2 | Not interrupt | Not interrupt | Not interrupt | Not interrupt | Not interrupt | Not interrupt | interrupt | Not interrupt | Interrupt | Not interrupt | Not interrupt |

Referring to Table 1 above, the sum of the adhesion strength of the adhesion part and the elastic strength of the entire pressing part was 3 kgf/cm, 5 kgf/cm, 2 kgf/cm, 4 kgf/cm, 2 kgf/cm, and 4 kgf/cm. Here, in the current interrupt device according to Experimental Example 1, the current interruption occurred, and in the current interruption device of Experimental Example 2, the current interruption did not occur.

As described above, in the current interrupt device according to an embodiment, if the adhesion strength of the adhesion part or the elastic modulus with respect to the entire pressing part is too large, the external force causing the electrical interception becomes too large. As a result, the electrical interception does not occur even though the electrical interception had to occur, and thus, the safety of the battery module may not be secured. In the current interrupt device according to the present invention, if the adhesion strength of the adhesion part or the elastic modulus of the entire pressing part is too small, even when the battery or the battery module is merely stored at the high temperature, the current interruption may occur, and thus, the defective rate of the battery module may increase. However, in the case of Embodiments 1 to 6, as shown in Table 1, it was confirmed that when the electrical interruption is required, the electrical interception is performed to secure the safety of the battery module, and when the battery module is in the high-temperature storage state, no failure occurs in the battery module because the electrical interruption does not occur.

On the other hand, in the case of Comparative Examples 1 and 3, the adhesion strength of the adhesion part or the elastic strength with respect to the entire pressing part was 1 kgf/cm. In this case, in Experimental Example 1, it was confirmed that although the safety of the battery module is ensured by the occurrence of the electrical interruption, even if the battery module is in the high-temperature storage state, the battery module is defective by the occurrence of the electrical interruption.

Also, in the case of Comparative Examples 2, 4, and 5, each of the adhesion strength of the adhesion part or the elastic strength with respect to the entire pressing part was 7 kgf/cm, 6 kfg/cm, and 7 kfg/cm. In this case, in Experimental Example 2, it was confirmed that when the battery module is in the high-temperature storage state, the battery module isn't defective due to no electrical interruption, but in Experimental Example 1, the safety of the battery module is not ensured due to no electrical interruption in the overcharged state.

Thus, in the current interrupt device according to the present invention, it is confirmed that when the sum of the adhesion strength of the adhesion part and the elastic strength of the entire pressing part is 2 kgf/cm to 5 kgf/cm, the safety of the battery module is ensured, and the problem of the failure of the battery module is solved.

While the embodiments of the present invention have been described with reference to the specific embodiments, it will be apparent to those skilled in the art that various changes and modifications may be made without departing from the spirit and scope of the invention as defined in the following claims.

The invention claimed is:

1. A current interrupt device comprising:
   a first connection part having one surface on which an inclined surface is formed;
   a second connection part having one surface on which an inclined surface having a shape corresponding to the inclined surface of the first connection part is formed;
   a first fixing part disposed on an outer portion of the first connection part so that the first connection part is configured to be coupled to a portion of a circumferential portion of a first secondary battery; and
   a second fixing part disposed on an outer portion of the second connection part so that the second connection part is configured to be coupled to a portion of a circumferential portion of a second secondary battery,
   wherein the inclined surface of the first connection part and the inclined surface of the second connection part contact each other to form a contact interface,
   the first connection part and the second connection part are electrically connected to each other,
   the inclined surface of the first connection part and the inclined surface of the second connection part are configured to be dislocated with respect to each other at the contact interface to interrupt electrical connection between the first connection part and the second connection part,
   the first fixing part forms a corner with and extends substantially perpendicular to a remainder of the first connection part, and
   the second fixing part forms a corner with and extends substantially perpendicular to a remainder of the second connection part.

2. The current interrupt device of claim 1, further comprising an adhesion part disposed on the contact interface so that the inclined surface of the first connection part and the inclined surface of the second connection part adhere to each other.

3. The current interrupt device of claim 1, wherein the first secondary battery applies an external force from the first connection part toward the inclined surface of the first connection part when the first secondary battery is swollen,
the second secondary battery applies an external force from the second connection part toward the inclined surface of the second connection part when the second secondary battery is swollen.

4. The current interrupt device of claim 1, further comprising:
an adhesion material disposed on at least a portion of a surface of the first fixing part configured to be coupled to the portion of the circumferential portion of the first secondary battery, and
an adhesion material disposed on at least a portion of a surface of the second fixing part configured to be coupled to the portion of the circumferential portion of the second secondary battery.

5. A current interrupt device comprising:
a first connection part having one surface on which an inclined surface is formed;
a second connection part having one surface on which an inclined surface having a shape corresponding to the inclined surface of the first connection part is formed;
a first fixing part disposed on an outer portion of the first connection part so that the first connection part is configured to be in contact with a portion of a circumferential portion of a first secondary battery; and
a second fixing part disposed on an outer portion of the second connection part so that the second connection part is configured to be in contact with a portion of a circumferential portion of a second secondary battery,
wherein the inclined surface of the first connection part and the inclined surface of the second connection part contact each other to form a contact interface,
the first connection part and the second connection part are electrically connected to each other,
the inclined surface of the first connection part and the inclined surface of the second connection part are configured to be dislocated with respect to each other at the contact interface to interrupt electrical connection between the first connection part and the second connection part, and
a surface of the first fixing part configured to be in contact with the portion of the circumferential portion of the first secondary battery faces away from a surface of the second fixing part configured to be in contact with the portion of the circumferential portion of the second secondary battery.

6. The current interrupt device of claim 5, further comprising an adhesion part disposed on the contact interface so that the inclined surface of the first connection part and the inclined surface of the second connection part adhere to each other.

7. The current interrupt device of claim 5, wherein the first secondary battery applies an external force from the first connection part toward the inclined surface of the first connection part when the first secondary battery is swollen,
the second secondary battery applies an external force from the second connection part toward the inclined surface of the second connection part when the second secondary battery is swollen.

8. The current interrupt device of claim 5, further comprising:
an adhesion material disposed on at least a portion of the surface of the first fixing part in contact with the portion of the circumferential portion of the first secondary battery, and
an adhesion material disposed on at least a portion of the surface of the second fixing part in contact with the portion of the circumferential portion of the second secondary battery.

9. A battery module comprising:
a first battery;
a second battery spaced apart from the first battery; and
a current interrupt device disposed between the first battery and the second battery, the current interrupt device comprising:
a first connection part having one surface on which an inclined surface is formed;
a second connection part having one surface on which an inclined surface having a shape corresponding to the inclined surface of the first connection part is formed;
a first fixing part disposed on an outer portion of the first connection part and in contact with a portion of a circumferential portion of the first battery; and
a second fixing part disposed on an outer portion of the second connection part and in contact with a portion of a circumferential portion of the second battery,
wherein the inclined surface of the first connection part and the inclined surface of the second connection part contact each other to form a contact interface,
the first connection part and the second connection part are electrically connected to each other, and
the inclined surface of the first connection part and the inclined surface of the second connection part are configured to be dislocated with respect to each other at the contact interface to interrupt electrical connection between the first connection part and the second connection part,
wherein a surface of the first fixing part in contact with the portion of the circumferential portion of the first battery faces away from a surface of the second fixing part in contact with the portion of the circumferential portion of the second battery.

* * * * *